United States Patent
Nakamura et al.

(10) Patent No.: US 12,017,266 B2
(45) Date of Patent: Jun. 25, 2024

(54) STICK CURVATURE CORRECTION DEVICE

(71) Applicant: HITEC CO., LTD., Yokohama (JP)

(72) Inventors: Tatsuo Nakamura, Yokohama (JP);
Katsuya Tanabe, Yokohama (JP);
Hirokatsu Harasawa, Yokohama (JP);
Shinya Yamada, Yokohama (JP)

(73) Assignee: HITEC CO., LTD., Yokohama (JP)

( * ) Notice: Subject to any disclaimer, the term of this patent is extended or adjusted under 35 U.S.C. 154(b) by 0 days.

(21) Appl. No.: 18/072,956

(22) Filed: Dec. 1, 2022

(65) Prior Publication Data
US 2023/0390819 A1 Dec. 7, 2023

(30) Foreign Application Priority Data

Jun. 7, 2022 (JP) ................ 2022-091952

(51) Int. Cl.
*B21D 3/02* (2006.01)
*B21D 43/00* (2006.01)
*B21D 45/02* (2006.01)
*A22C 15/00* (2006.01)

(52) U.S. Cl.
CPC ............. *B21D 3/02* (2013.01); *B21D 43/003* (2013.01); *B21D 45/02* (2013.01); *A22C 15/001* (2013.01)

(58) Field of Classification Search
CPC ... B21D 3/00; B21D 3/02; B21D 3/04; B21D 3/14; B21D 3/16; B21D 7/14
See application file for complete search history.

(56) References Cited

FOREIGN PATENT DOCUMENTS

| JP | 2021-019542 A | | 2/2021 | |
| JP | 2021019542 A | * | 2/2021 | |
| WO | WO-2020062362 A1 | * | 4/2020 | ............ B21C 51/00 |

OTHER PUBLICATIONS

Machine Translation of JP 2021-19542A (Year: 2021).*
Machine Translation of WO 2020062362A1 (Year: 2020).*

* cited by examiner

*Primary Examiner* — Debra M Sullivan
(74) *Attorney, Agent, or Firm* — MCGINN I.P. LAW GROUP, PLLC

(57) ABSTRACT

Provided is a stick curvature correction device that can determine a curvature of a stick with a simple structure and correct a curvature of a curved stick. The stick curvature correction device includes a curvature detection unit, a center push-up unit, a stick holding unit, and a stick correction unit. The curvature detection unit includes two-end push-up units, and a multi-point sensor unit. The center push-up unit causes a curved stick to axially rotate to be in a mountain bow state, and pushes up a part between a left end and a center of the stick. The stick holding unit holds the right end of the stick, and holds the stick slidably in a direction of the left end of the stick. The stick correction unit applies a force in a direction opposite to a curve direction of the put stick and corrects a curvature of the curved stick.

6 Claims, 3 Drawing Sheets

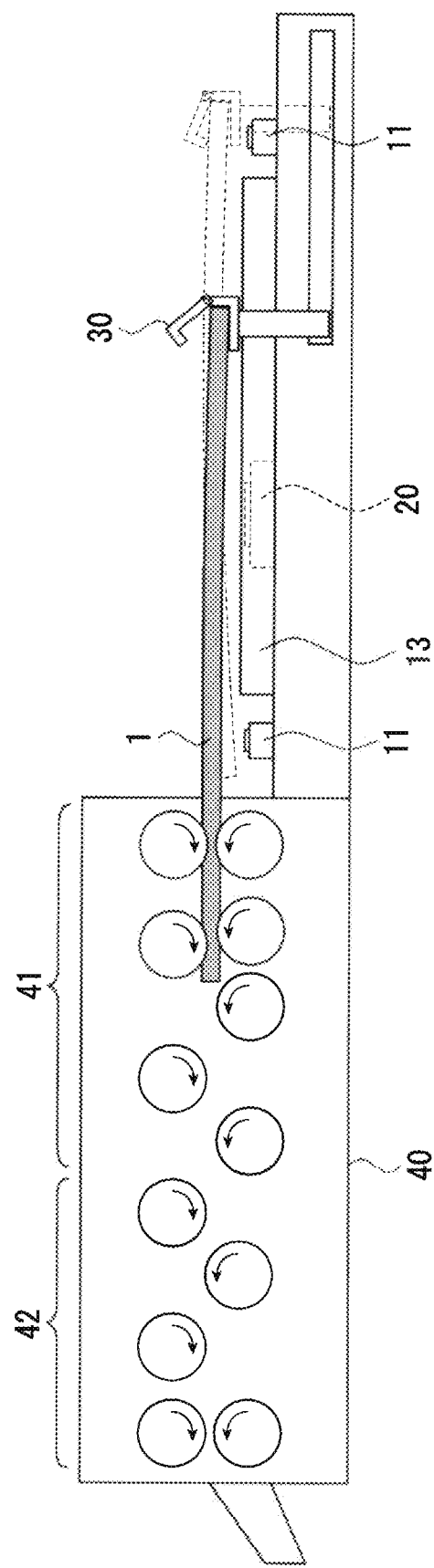

STICK CURVATURE CORRECTION DEVICE

BACKGROUND OF THE INVENTION

Field of the Invention

The present invention relates to a stick curvature correction device, and more particularly to a stick curvature correction device configured to correct a curvature of a stick for suspending food.

Description of the Related Art

For example, a stick for suspending a chain of sausages is used in a sausage production line. The stick is made of a columnar or cylindrical metal. Since a heavy sausage is suspended on such a stick, the stick may be curved during suspending and moving. Specifically, since the chain of sausages is suspended in the vicinity of a center while two ends of the stick are held, the stick is often curved in a bow shape.

For example, Patent Document 1 discloses a stick feeding device that detects and removes such a curved stick. The stick feeding device disclosed in Patent Document 1 is provided with a stick bending amount measuring unit near each of two ends of a horizontally supported stick that measures a bending amount of the stick, and causes the stick bending amount measuring unit to rotate in a vertical plane to measure the bending amount of the stick and remove a bent stick.

CITATION LIST

Patent Document

Patent Document 1: JP-A-2021-019542

However, the stick feeding device disclosed in Patent Document 1 uses a motor or the like to cause the stick bending amount measuring unit to rotate in the vertical plane, and the device itself is complicated and expensive. The stick feeding device is a device that simply detects and removes the bent stick, and thus, in the related art, the removed sticks have been manually corrected for a curvature, and severely curved sticks have been discarded. Therefore, it has been desired to develop a device that can easily determine whether a stick is curved with a simple structure and corrects a curvature of a curved stick.

In view of such circumstances, an object of the present invention is to provide a stick curvature correction device that can determine a curvature of a stick with a simple structure and correct a curvature of a curved stick.

SUMMARY OF THE INVENTION

In order to achieve the above object of the present invention, a stick curvature correction device according to the present invention includes: a curvature detection unit configured to detect a curvature of a stick, the curvature detection unit including two-end push-up units configured to push up two ends of the stick in order to cause a curved stick to axially rotate to be in a valley bow state, and a multi-point sensor unit configured to detect positions of multiple points in a longitudinal direction of the stick pushed up by the two-end push-up unit, and lowering the two ends of the stick pushed up by the two-end push-up unit after detecting the positions of the multiple points in the longitudinal direction of the stick by the multi-point sensor unit; a center push-up unit configured to cause the curved stick to axially rotate to be in a mountain bow state if the curvature of the stick detected by the curvature detection unit is larger than a predetermined threshold, and push up a part between one end and a center of the stick such that the other end of the stick is lower than the one end of the stick; a stick holding unit configured to hold the other end of the stick such that the stick pushed up by the center push-up unit does not axially rotate, and hold the stick slidably in a direction of the one end of the stick; and a stick correction unit configured to apply a force in a direction opposite to a curve direction of the stick when the stick that is slid without axial rotation by the stick holding unit is put, and correct a curvature of the curved stick.

Further, the stick curvature correction device may include a normal stick ejection unit configured to eject the stick if the curvature of the stick detected by the curvature detection unit is smaller than the predetermined threshold.

The stick correction unit may include: a guide roller unit configured to convey, in the longitudinal direction, the stick that is put without the axial rotation by the stick holding unit in a state where the stick does not axially rotate; and a correction roller unit configured to apply a force in the direction opposite to the curve direction of the stick.

The stick curvature correction device of the present invention has an advantage that a curvature of a stick can be determined with a simple structure and a curvature of a curved stick can be corrected.

BRIEF DESCRIPTION OF THE DRAWINGS

FIG. 4 is a schematic side view for illustrating details of a stick holding unit and a stick correction unit of the stick curvature correction device of the present invention.

DETAILED DESCRIPTION OF THE PREFERRED EMBODIMENTS

Figure 1:
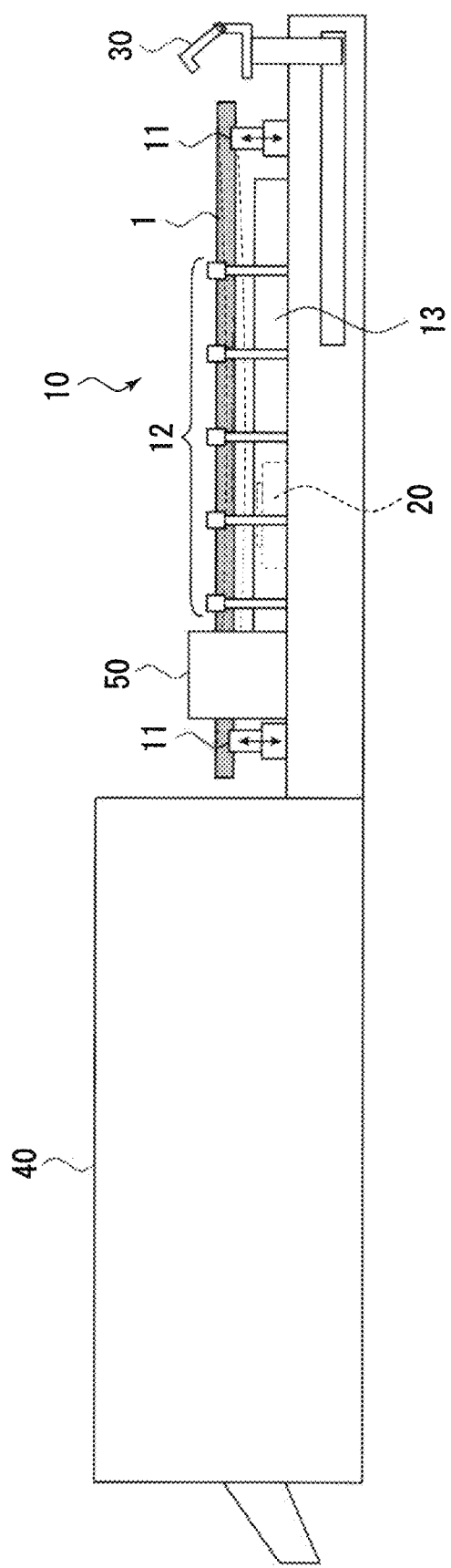
FIG. 1 is a schematic side view for illustrating an overall configuration of a stick curvature correction device of the present invention.

Hereinafter, embodiments of the present invention will be described with reference to a shown example. A stick curvature correction device of the present invention is used to correct a curvature of a stick for suspending food. FIG. 1 is a schematic side view for illustrating an overall configuration of the stick curvature correction device of the present invention. As shown in FIG. 1, the stick curvature correction device of the present invention mainly includes a curvature detection unit 10, a center push-up unit 20, a stick holding unit 30, and a stick correction unit 40. The present description describes an example in which the stick holding unit 30 is disposed on one side, specifically on a right side of a stick 1, and the stick correction unit 40 is disposed on the other side, specifically on a left side of the stick 1, but the present invention is not limited thereto, and conversely, an example in which the stick holding unit 30 is disposed on the left side of the stick 1 and the stick correction unit 40 is disposed on the right side of the stick 1 may be used.

The curvature detection unit 10 includes two-end push-up units 11 and a multi-point sensor unit 12. The curvature detection unit 10 detects a curvature of the stick 1 pushed up by the two-end push-up units 11. The curvature detection unit 10 may be a unit that can determine the difference between a curved stick and a non-curved stick. The curvature detection unit 10 detects positions of multiple points in a longitudinal direction of the stick 1 by the multi-point sensor unit 12, and then lowers two ends of the stick 1 pushed up by the two-end push-up units 11. That is, the two-end push-up units 11 push up the stick 1 in order to detect the curvature by the multi-point sensor unit 12, and lower the stick 1 after the curvature is detected.

The two-end push-up units 11 are units that push up the two ends of the stick 1. By pushing up two ends of the stick 1, a curved stick 1 axially rotates so as to be in a valley bow state. That is, the two-end push-up units 11 are units that push up the two ends of the stick 1 in order to cause the curved stick 1 to axially rotate to be in the valley bow state. When the two ends of the stick 1 are pushed up by the two-end push-up units 11, a non-curved stick 1 is lifted horizontally without the axial rotation. However, when the stick 1 is curved, the stick 1 axially rotates such that a center of the stick 1 is bent downward. In the present description, such a state where the center of the stick 1 is bent downward is referred to as the valley bow state.

The sticks 1 to be pushed up by the two-end push-up units 11 are arranged one by one on a stick tray 13 provided between two push-up portions of the two-end push-up units 11. The stick tray 13 may have, for example, a V-shaped groove on an upper surface such that a longitudinal axis of the stick 1 can be positioned. The two-end push-up units 11 may push up the two ends of the stick 1 placed on the stick tray 13.

The two-end push-up unit 11 in the shown example includes the two push-up portions disposed at two ends of the stick tray 13 to push up the two ends of the stick 1. The two-end push-up units 11 move up and down so as to lower or push up the two ends of the stick 1. Since the curved stick 1 axially rotates, push-up surfaces of the two-end push-up units 11 may be appropriately configured in a U-shape such that the stick 1 does not fall sideways. The two-end push-up unit 11 may include an actuator such as an air cylinder or a hydraulic cylinder. The two-end push-up unit 11 is not limited to the actuator, and may be of any structure such as one using a rack and pinion gear and a motor, or one using a ball screw and the like.

Figure 2:
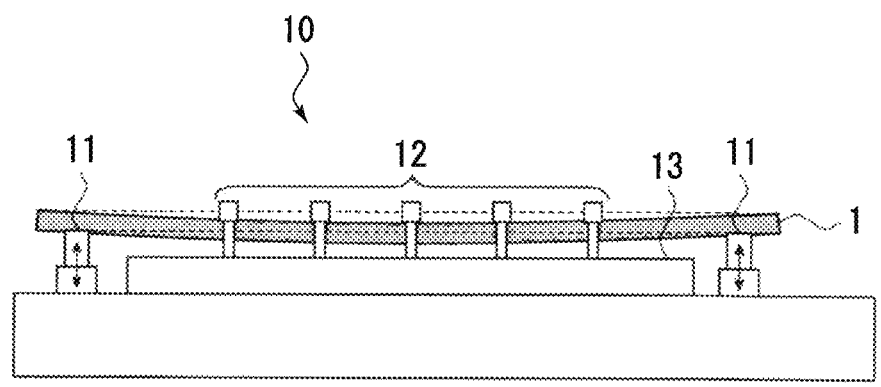
FIG. 2 is a schematic side view for illustrating details of a curvature detection unit of the stick curvature correction device of the present invention.

FIG. 2 is a schematic side view for illustrating details of the curvature detection unit of the stick curvature correction device of the present invention. In FIG. 2, parts having the same reference numerals as in FIG. 1 represent the same objects. Only parts around the curvature detection unit 10 are shown, and other parts are omitted in FIG. 2. The stick 1 whose two ends are pushed up by the two-end push-up units 11 is in a state of floating from the stick tray 13. In this case, as described above, if the stick 1 is not curved, the stick 1 does not rotate about the longitudinal axis and is maintained parallel to the stick tray 13 (state of broken lines in FIG. 2). However, as shown in FIG. 2, if the stick 1 is curved in a bow shape, the stick 1 axially rotates at the two-end push-up units 11 to be in the valley bow state, and the vicinity of the center is bent downward. That is, while the stick 1 axially rotates due to its own weight, the vicinity of the center is bent downward. The multi-point sensor unit 12 of the curvature detection unit 10 detects such a part of the stick 1 that is in the valley bow state.

The multi-point sensor unit 12 in the shown example is configured to detect the positions of the multiple points in the longitudinal direction of the stick 1. Specifically, the multi-point sensor unit 12 is formed by arranging multiple laser sensors in a straight line along an upper end of the stick 1 so as to enable non-contact detection, for example. The multi-point sensor unit 12 is configured to receive a reflected light of a laser light reflected from the non-curved stick 1 to detect that the stick 1 is not curved. When the curved stick 1 is pushed up by the two-end push-up units 11 and axially rotates to be in the valley bow state, the reflected light of the laser light to the multi-point sensor unit 12 is no longer received, so that it is possible to detect that the stick 1 is curved. In this way, in the curvature detection unit 10, the multi-point sensor unit 12 detects a position change of the stick 1 at the multiple points. Since the stick 1 is normally curved to some extent, the curvature detection unit 10 may determine that the stick is curved if the curvature is larger than a predetermined threshold. The threshold may be determined based on, for example, how many of the laser sensors of the multi-point sensor unit 12 can receive the reflected light.

In the curvature detection unit 10, according to a degree of curve of the stick 1, a curvature correction is performed if the curvature is larger than the predetermined threshold, and it is possible to determine that the stick 1 is normal if the curvature is smaller than the predetermined threshold. In this case, if it is determined that the stick 1 is normal, the stick 1 can be ejected from the curvature correction device because the curvature correction is unnecessary. In the example shown in FIG. 1, a normal stick ejection unit 50 for ejecting the normal stick 1 is provided. The normal stick ejection unit 50 ejects the stick 1 if the curvature of the stick 1 detected by the curvature detection unit 10 is smaller than the predetermined threshold. After the positions of the multiple points of the stick 1 in the longitudinal direction are detected by the multi-point sensor unit 12, the two ends of the stick 1 pushed up by the two-end push-up units 11 are lowered, and the stick 1 is placed on the stick tray 13. Therefore, if the curvature of the stick 1 detected by the curvature detection unit 10 is smaller than the predetermined threshold, that is, if the curve of the stick 1 is not detected, the stick 1 placed on the stick tray 13 can be, for example, pushed out laterally by the normal stick ejection unit 50, and then the stick 1 falls sideways from the stick tray 13, and is stocked in a stick stock portion (not shown) or the like.

Figure 3:
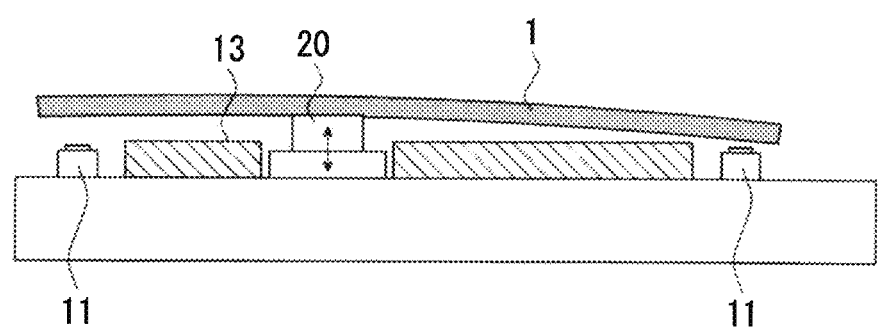
FIG. 3 is a schematic side view for illustrating a state of a stick pushed up by a center push-up unit of the stick curvature correction device of the present invention.

FIG. 3 shows a schematic side view for illustrating a state of the stick pushed up by the center push-up unit of the stick curvature correction device of the present invention. In FIG. 3, parts having the same reference numerals as in FIG. 1 represent the same objects. Only parts around the center push-up unit 20 are shown, and other parts are omitted in FIG. 3. The stick tray 13 is shown in a cross-sectional view. The center push-up unit 20 pushes up a part between a left end and the center of the stick 1 if the curvature of the stick 1 detected by the curvature detection unit 10 is larger than the predetermined threshold. That is, the center push-up unit 20 pushes up a part closer to a stick correction unit 40 side than the center of the stick 1. As shown in FIG. 3, the center push-up unit 20 may be disposed between a left end and a center of the stick tray 13. When the part between the left end and the center of the stick 1 is pushed up, the stick 1 axially rotates due to its own weight, and the two ends are lowered to a lower side. In the present description, such a state where the two ends of the stick 1 are lowered to a lower side is referred to as a mountain bow state. In this case, since the part between the left end and the center of the stick 1 is pushed up by the center push-up unit 20, a right end of the stick 1 is lowered more than the left end of the stick 1. That is, the center push-up unit 20 causes the curved stick 1 to axially rotate to be in the mountain bow state, and pushes up the left side of the center of the stick 1 such that the right end of the stick 1 is lowered. Accordingly, the right end of the stick 1 can be pressed and clamped from above by the stick holding unit 30 which will be described later.

Since the curved stick 1 axially rotates, a push-up surface of the center push-up unit 20 may be appropriately configured in a U-shape such that the stick 1 does not fall sideways. The center push-up unit 20 may include an actuator such as an air cylinder or a hydraulic cylinder. The center push-up unit 20 is not limited to the actuator, and may be of any structure such as one using a rack and pinion gear and a motor, or one using a ball screw and the like.

FIG. 4 shows a schematic side view for illustrating details of the stick holding unit and the stick correction unit of the stick curvature correction device of the present invention. In FIG. 4, parts having the same reference numerals as in FIG. 1 represent the same objects. Only parts around the stick holding unit 30, the stick correction unit 40, and surroundings thereof are shown, and the other parts are omitted in FIG. 4. As shown in FIG. 4, the stick holding unit 30 holds the right end of the stick 1 such that the stick 1 pushed up by the center push-up unit 20 does not axially rotate, and holds the stick 1 slidably in a direction of the left end of the stick 1. That is, the stick 1 is held in a state where the curve direction of the stick 1 which is determined to be curved by the curvature detection unit 10 faces a predetermined direction. As shown in FIG. 4, the stick holding unit 30 slides the stick 1 toward the stick correction unit 40 side while holding the stick 1 in the mountain bow state.

When the stick holding unit 30 slides the stick 1 toward the stick correction unit 40 side, the center push-up unit 20 may be lowered. That is, when the stick holding unit 30 is to hold the stick 1, the center is pushed up by the center push-up unit 20, and then the center push-up unit 20 may be lowered while the stick has been held by the stick holding unit 30, and the stick is slid to the stick correction unit 40 side. Accordingly, the stick 1 is put into the stick correction unit 40, which will be described later, always in the mountain bow state.

Specifically, the stick holding unit 30 may include, for example, a clamp portion that presses and clamps the right end of the stick 1 from above. As described above, the curved stick 1 pushed up by the center push-up unit 20 is in a state where the right end is lower than the left end, and thus the lower right end is pressed and clamped from above by the clamp portion and is held such that the stick 1 does not axially rotate. The stick 1 may be pushed out toward the stick correction unit 40 side and may slide while being pressed and clamped from above by the clamp portion. The stick holding unit 30 does not pass by the center push-up unit 20 to slide to the stick correction unit 40 side.

In this way, in the stick curvature correction device of the present invention, first, the two ends of the stick 1 are pushed up by the two-end push-up units 11, and the curved stick 1 axially rotates so as to be in the valley bow state, and can be detected in the curvature detection unit 10. When the curvature of the stick 1 is detected by the curvature detection unit 10, the two ends of the stick 1 pushed up by the two-end push-up units 11 are lowered, and the left side of the center of the stick 1 is pushed up by the center push-up unit 20, so that the curved stick 1 axially rotates so as to be in the mountain bow state, and the right end of the stick 1 is lower than the left end of the stick 1. The stick holding unit 30 holds the stick 1 in the mountain bow state. In this state, the stick 1 can be put into the stick correction unit 40 which will be described later.

The stick correction unit 40 corrects the curvature of the curved stick 1. As described above, the stick 1 that is slid by the stick holding unit 30 without the axial rotation is put into the stick correction unit 40. Therefore, the curved stick 1 is always put into the stick correction unit 40 in a direction same to the curve direction, that is, in the mountain bow state. Therefore, the stick correction unit 40 may always correct the curvature in the same direction so as to make the curved stick turn to a straight one. Therefore, the stick correction unit 40 may be configured to apply a force in a direction opposite to the curve direction of the stick 1, specifically a downward direction.

The stick correction unit 40 in the shown example includes a guide roller unit 41 and a correction roller unit 42. The guide roller unit 41 includes multiple rollers, and conveys the stick 1 that is slid in the longitudinal direction of the stick 1 by the stick holding unit 30 in the longitudinal direction without the axial rotation. After the stick 1 that is slid and pushed out to the stick correction unit 40 side with the stick holding unit 30 clamping the stick 1 is put into the guide roller unit 41, the stick holding unit 30 may release the clamping of the stick 1. More specifically, as shown in FIG. 4, when the stick 1 is rolled in to a predetermined roller position of the guide roller unit 41, the sliding driven by the stick holding unit 30 is stopped and the holding is released. Accordingly, the stick 1 is conveyed to a correction roller unit 42 side while being held by the guide roller unit 41 with the curve direction of the stick 1 always in the mountain bow state. The guide roller unit 41 does not particularly apply a force to the stick 1 for correction. Meanwhile, the correction roller unit 42 is configured to apply a force in the direction opposite to the curve direction of the stick 1. Since the stick 1 is curved in the mountain bow state where the vicinity of the center is bent upward, the multiple rollers are disposed in the correction roller unit 42 so as to apply a downward force to the stick 1. Disposing positions of the multiple rollers of the correction roller unit 42 may be configured to be freely changed. That is, the degree of curvature and a correction amount of the curved stick may be determined in advance, and the disposing positions of the multiple rollers may be determined based thereon. The disposing position and the number of the guide roller unit 41 or the correction roller unit 42 are not limited to the shown example, and the stick correction unit 40 may be configured to apply a force in the direction opposite to the curve direction of the stick 1.

The stick 1 whose curvature cannot be corrected at one time can be put into the stick curvature correction device again. That is, the stick correction unit 40 performs the curvature correction on the stick 1 for which the curvature detection unit 10 determines that the curvature is larger than the predetermined threshold, and the stick that has passed through the stick correction unit 40 is sent again to the two-end push-up units 11 of the stick curvature correction device of the present invention, and repeatedly subjected to curvature correction by the stick correction unit 40 until the curvature detection unit 10 determines that the stick is not curved.

In this way, the stick curvature correction device of the present invention can determine the curvature of the stick with a simple structure and correct the curvature of the curved stick.

The stick curvature correction device of the present invention is not limited to the above shown examples, and of course, various changes can be made without departing from the gist of the present invention.

What is claimed is:

1. A stick curvature correction device for correcting a curvature of a stick used for suspending food, the stick curvature correction device comprising:
   a curvature detection unit detecting a curvature of the stick having a curved section, the curvature detection unit including two-end push-up portions and a multi-point sensor unit disposed between the two-end push-up portions, the multi-point sensor unit including a plurality of sensors arranged in a longitudinal direction, one of the two-end push-up portions pushing up one end of the stick and an other of the two-end push-up portions pushing up an other end opposite to the one end of the stick so that the curved section of the stick is located in a downward position by rotating the stick axially;
   a center push-up unit movable in a vertical direction for pushing up a part located between the one end and a center of the stick, the center push-up unit pushing up the part so that, by rotating the stick axially after lowering the one end of the stick by the two-end push-up portions, the curved section of the stick is located from the downward position to an upward position and so that the other end is located in a lower position than that of the one end;
   a stick holding unit holding the stick; and
   a stick correction unit including a correction roller, the correction roller of the stick correction unit applying a force to the curved section in a direction opposite to a curve direction of the stick when the stick holding unit supplies the stick so as to correct the curvature of the stick,
   wherein the multi-point sensor unit detects plural points of the stick in accordance with an arrangement position of the plurality of sensors when the two-end push-up portions pushes up the one end and the other end of the stick, and
   wherein the stick holding unit holds the other end of the stick located in the lower position in a slidable but unrotatable manner in the longitudinal direction, while maintaining the upward position of the curved section of the stick.

2. The stick curvature correction device according to claim 1, further comprising a normal stick ejector that ejects the stick when the curvature detection unit detects the curvature less than a predetermined threshold.

3. The stick curvature correction device according to claim 2,
   wherein the stick correction unit includes a guide roller conveying the stick in an unrotatable manner in the longitudinal direction and supplying the stick to the stick correction unit.

4. The stick curvature correction device according to claim 1,
   wherein the stick correction unit includes a guide roller conveying the stick in an unrotatable manner in the longitudinal direction and supplying the stick to the stick correction unit.

5. The stick curvature correction device according to claim 1,
   wherein the center push-up unit pushes up the part of the stick, when the curvature detection unit detects the curvature equal to or more than a predetermined threshold value.

6. A method for correcting a curvature of a stick used for suspending food, the method comprising:
   detecting a curvature of the stick having a curved section by using a curvature detection unit which includes two-end push-up portions and a multi-point sensor unit disposed between the two-end push-up portions, the multi-point sensor unit including a plurality of sensors arranged in a longitudinal direction;
   pushing up a part located between one end and a center of the stick by a center push-up unit movable in a vertical direction, when the curvature detection unit detects the curvature equal to or more than a predetermined threshold value;
   holding the stick by a stick holding unit; and
   correcting the curvature of the stick by a stick correction unit including a correction roller,
   wherein the detecting a curvature of the stick includes one of the two-end push-up portions pushing up the one end of the stick and an other of the two-end push-up portions pushing up an other end opposite to the one end of the stick so that the curved section of the stick is located in a downward position by rotating the stick axially, and detecting plural points of the stick by the multi-point sensor unit in accordance with an arrangement position of the plurality of sensors when the two-end push-up portions pushes up the ends of the stick,
   in the pushing up the part, by rotating the stick axially after lowering the one end of the stick by the two-end push-up portions, the curved section of the stick is positioned from the downward position to an upward position and the other end is positioned in a lower position than that of the one end,
   in the holding the stick, the stick holding unit holds the other end of the stick located in the lower position in a slidable but unrotatable manner in the longitudinal direction, while maintaining the upward position of the curved section of the stick, and
   in the correcting the curvature of the stick, the correction roller applies a force to the curved section in a direction opposite to a curve direction of the stick which is supplied from the stick holding unit so as to correct the curvature of the stick.

* * * * *